Jan. 21, 1964 C. R. BOWMAN 3,118,514
FRONT WHEEL DRIVE FOR TWO WHEELED VEHICLE
Filed May 21, 1962 2 Sheets-Sheet 1

Cloyd R. Bowman
INVENTOR.

BY *Clarence A. O'Brien*
*and Harvey B. Jackson*
Attorneys

Jan. 21, 1964     C. R. BOWMAN     3,118,514
FRONT WHEEL DRIVE FOR TWO WHEELED VEHICLE
Filed May 21, 1962     2 Sheets-Sheet 2
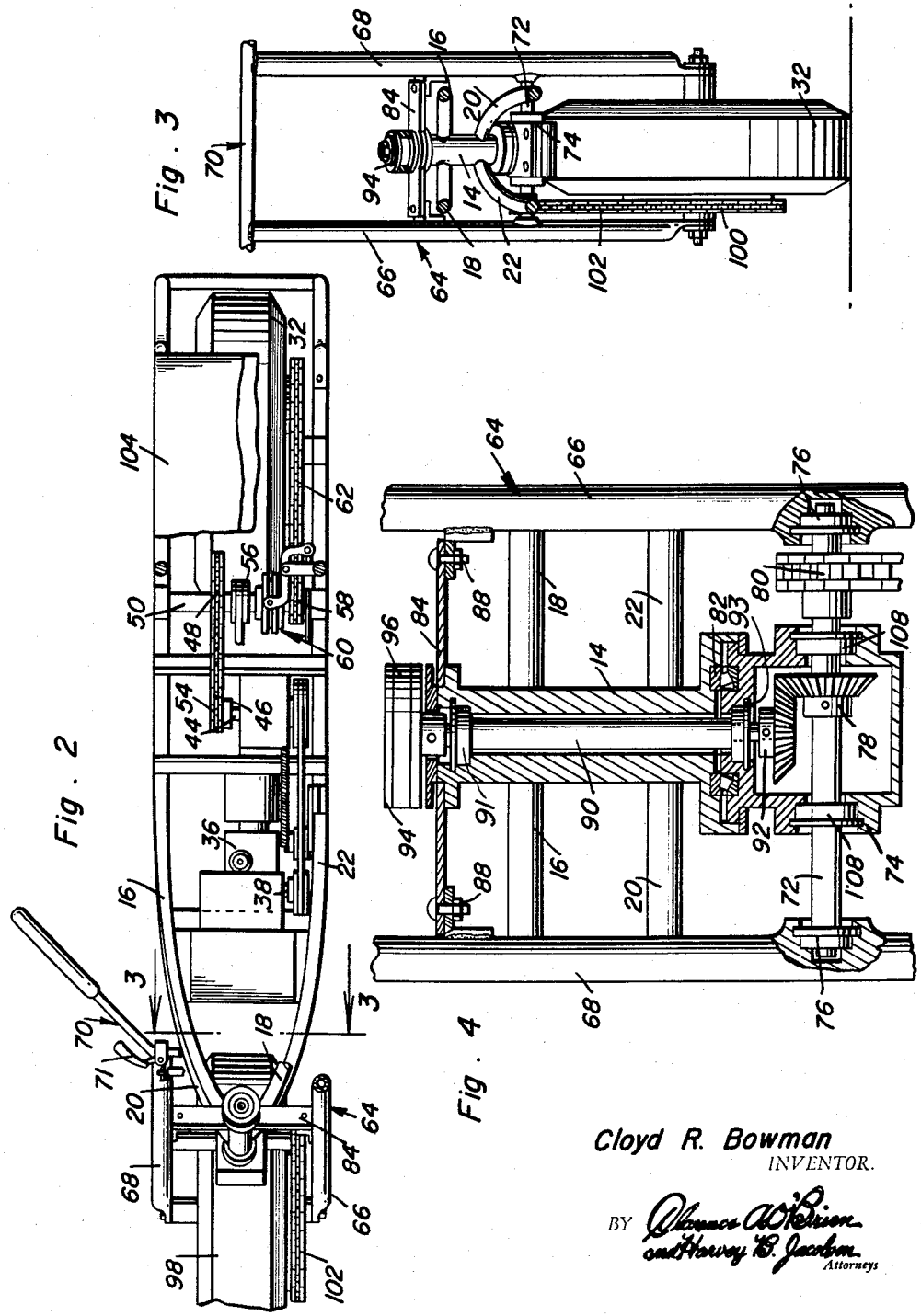
Cloyd R. Bowman
INVENTOR.

United States Patent Office 3,118,514
Patented Jan. 21, 1964

3,118,514
FRONT WHEEL DRIVE FOR TWO WHEELED VEHICLE
Cloyd R. Bowman, Rte. 2, Wilder, Idaho
Filed May 21, 1962, Ser. No. 196,862
3 Claims. (Cl. 180—31)

This invention relates to a novel and useful front wheel drive for two wheeled vehicles of the motorcycle or motor scooter type which provides an efficient economical means of drivingly connecting the front wheel of the motor scooter or motorcycle with the power output shaft of the motor carried by the main frame of the motorcycle.

Small lightweight motor scooter type vehicles have recently become popular as a mode of travel for hunters, fishermen, and/or campers over rough ground such as forests and mountains. In addition, these vehicles have also become popular as low speed racing vehicles for use on cross country courses, hill climbs and over soft terrain such as sand. These lightweight vehicles are provided with moderately powered engines and thus are not capable of extremely high speeds. Accordingly, in order to make a race of such vehicles interesting, although the speed at which the vehicles travel may be relatively slow in comparison to other racing vehicles, the course on which races of these vehicles are held are usually impossible to travel over at high speeds because of their steep inclines or because of their extreme roughness and lack of a firm surface.

When traveling over such a racecourse on a two wheeled vehicle, which is usually provided with rear wheel drive, the rear wheel often encounters terrain which does not offer sufficient traction to enable the two wheeled vehicle to be propelled forwardly under its own power.

It is accordingly the main object of this invention to provide a front wheel drive for two wheeled vehicles in order that the two wheeled vehicle may be driven through both wheels so as to substantially eliminate the possibility of the driving wheels of the vehicle not having sufficient traction to propel the two wheeled vehicle forwardly under its own power.

A further object of this invention, in accordance with the immediately preceding object, is to provide a front wheel drive for a two wheeled vehicle which will be simple in construction and readily adaptable to existing two wheeled motor vehicles.

Still another object of this invention is to provide a front wheel drive in accordance with the preceding objects which will require only slight modifications to existing two wheeled vehicles.

A final object to be specifically enumerated herein is to provide a front wheel drive for two wheeled vehicles which will conform to conventional forms of manufacture, be of simple construction and efficient in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary top plan view of the embodiment illustrated in FIGURE 1 with portions thereof being broken away and shown in section;

FIGURE 3 is a fragmentary sectional view taken substantially upon the plane indicated by the section line 3—3 of FIGURE 2; and FIGURE 4 is a transverse vertical sectional view on somewhat of an enlarged scale taken substantially upon the plane indicated by the section line 4—4 of FIGURE 1.

Figure 1:
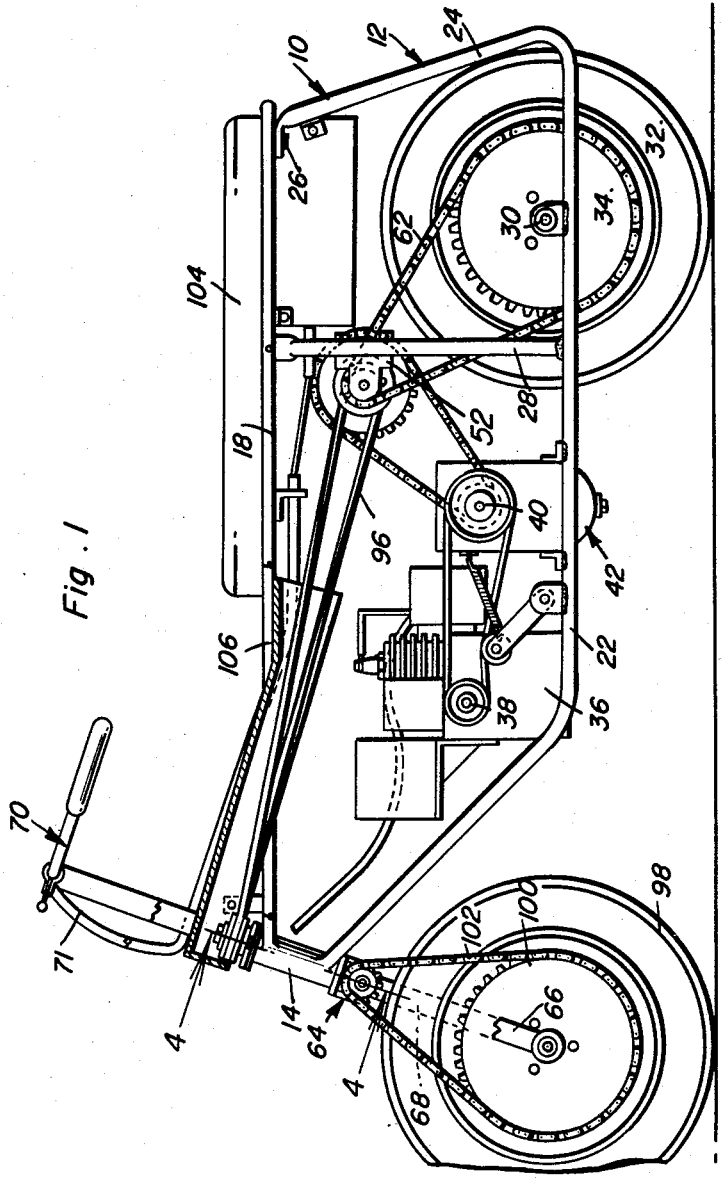
FIGURE 1 is a side elevational view of a conventional form of lightweight two wheeled vehicle shown with the front wheel drive of the instant invention incorporated therein, a portion of the fork assembly of the vehicle being broken away.

Referring now more specifically to the drawings the numeral 10 generally designates a two wheeled vehicle which includes a main frame referred to in general by the reference numermal 12. The main frame 12 includes an upstanding front sleeve portion 14 from which a pair of rearwardly extending opposite side upper frame members 16 and 18 project. A pair of opposite side lower frame members 20 and 22 also project rearwardly from the front sleeve member 14. The rear ends of the lower opposite side frame members 20 and 22 are laterally directed at their rear ends to form upstanding brace members 24 which are secured to the rear ends of the upper opposite side frame members 16 and 18 respectively by means of suitable fasteners 26.

The main frame 12 also includes a pair of opposite side vertical brace members 28 which are secured between corresponding ones of the upper and lower opposite side frame members.

A rear axle assembly 30 is secured between the rear ends of the lower opposite side frame members 20 and 22 and rotatably journals a rear wheel assembly 32 which has a sprocket 34 connected thereto.

A prime mover 36 is supported from the main frame 12 and includes an output shaft 38 which is drivingly connected to the input shaft 40 of a transmission generally referred to by the reference numeral 42. The transmission 42 includes an output shaft 44 and the output shaft 44 has a sprocket 46 mounted thereon which is aligned with a sprocket 48 fixed to a lay shaft 50 which is journalled for rotation from the main frame 12 by means of journal blocks 52 supported from the vertical brace members 28. An endless chain 54 drivingly connects the sprockets 46 and 48. A pulley 56 is rotatably mounted on the lay shaft as is a drive sprocket 58 and a clutch mechanism generally referred to by the reference numeral 60 is provided for alternately or simultaneously drivingly connecting the lay shaft 50, the pulley 56 and the drive sprocket 58. The drive sprocket 58 is aligned with and drivingly connected to the sprocket 34 by means of an endless chain 62.

A front fork assembly generally referred to by the reference numeral 64 is provided and the front fork assembly 64 includes a pair of depending legs 66 and 68 which are interconnected at their upper ends by means of a handlebar assembly generally referred to by the reference numeral 70.

A cross or output shaft 72 is rotatably supported between the legs 66 and 68 and it will be noted that the cross-shaft 72 is also journalled in a transmission housing 74. The opposite ends of the cross-shaft are journalled in bearings 76 secured in the legs 66 and 68 and the cross-shaft 72 has a bevel gear 78 secured thereto within the housing 74. Additionally, a drive sprocket 80 is fixedly secured to the cross-shaft 72 exteriorly of the housing 74 and between the latter and the leg 66.

The front sleeve member 14 is provided with a thrust bearing 82 at its lower end which rotatably journals the upper portion of the housing 74 and an upper brace 84 is secured between the legs 66 and 68 in any convenient manner such as by fasteners 88 and rotatably receives the upper end of the front sleeve member 14.

An intermediate or input shaft 90 projects through the front sleeve member 14 and is rotatably journalled thereby at its upper end from the sleeve member 14 by means of a bearing 91 for rotation about its longitudinal axis. The lower end of the intermediate shaft 90 is rotatably journalled in the housing 74 by means of a bearing 93 and is provided with a bevel gear 92 disposed within the housing 74 and in constant mesh with the bevel gear 78. It will be noted therefore that the intermediate shaft 90 is journalled for rotation about an axis coinciding with the axis of rotation of the front fork assembly 64 relative to the main frame 12.

The upper end of the intermediate shaft 90 has a pulley 94 fixed thereto and the pulley 56 on the lay shaft 50 is drivingly connected to the pulley 94 by means of an endless flexible belt 96.

A front wheel assembly 98 is rotatably supported between the lower ends of the legs 66 and 68 and has a driven sprocket 100 secured thereto. The driven sprocket 100 is disposed in constant alignment with the drive sprocket 80 and the drive sprocket 80 is drivingly connected to the driven sprocket 100 by means of an endless chain 102.

A handlebar assembly 70 is conventional in design and may include suitable controls 71 for controlling the speed of the engine 36 and the operation of the clutch control 60.

The main frame 12 includes a seat 104 and it will be noted that the rear portion of the endless flexible belt 96 is disposed beneath the seat 104. However, a housing 106 is provided and encloses the portion of the endless flexible belt disposed between the seat 104 and the intermediate shaft 90 so as to prevent the clothes or any portion of the body of a person driving the vehicle 10 from becoming entangled with the belt 96.

From FIGURE 4 of the drawings it may be seen that the cross-shaft 72 comprises a brace member extending between the legs 66 and 68. The cross-shaft 72 is rotatably journalled intermediate its opposite ends at points spaced longitudinally therealong in bearings 108 carried by opposite sides of the housing 74. As the front sleeve member 14 is substantially conventional in design and is adapted to be utilized in connection with a front fork assembly having an upstanding shank portion adapted to be passed through and rotatably journalled by the front sleeve member 14, it may be seen that a conventional two wheeled vehicle may be altered so as to incorporate the front wheel drive of the instant invention merely by the removal of its conventional front fork assembly and the installation of a front fork assembly similar to front fork assembly 64. Additionally, in order to modify an existing two wheeled vehicle, it would be necessary to provide the pulley 56 on the lay shaft 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle including a longitudinally extending main frame, rear wheel means journaled from the rear of said main frame, a forwardly and downwardly inclined sleeve fixedly supported from the forward end of said main frame, a right angle drive casing, bearing means carried by the lower end of said sleeve journaling the upper portion of said casing for rotation about an axis coinciding with the longitudinal axis of said sleeve, an upright input shaft for said casing, bearing means carried by said casing journaling the lower end of said input shaft through the upper portion of said casing for rotation about an axis coinciding with the axis of rotation of said casing, the upper end portion of said input shaft extending through said sleeve and journaled by means of bearing means supported from the upper end portion of said sleeve, an output shaft, bearing means in opposite sides of said casing journaling said output shaft through said casing for rotation about an axis disposed at substantially right angles relative to the rotation of said input shaft, gear wheels in constant mesh carried by the portions of said input shaft and output shaft disposed in said casing drivingly coupling said input shaft in said output shaft, a front fork assembly including a pair of depending generally parallel legs, transverse brace means interconnecting the upper end portions of said legs and rotatably supported from the upper end of said sleeve for rotation about the longitudinal axis of said sleeve, a front wheel journaled between the lower ends of said legs for rotation about a generally horizontally disposed axis at substantially right angles relative to the axis of rotation of said front fork assembly, a prime mover on said frame including an output shaft, means drivingly connecting said prime mover output shaft to the upper end portion of said input shaft projecting above said sleeve, aligned bearing means carried by said legs rotatably journaling the opposite end portions of said right angle drive casing output shaft, and means drivingly connecting one end of the last-mentioned shaft to said front wheel.

2. The combination of claim 1 including means drivingly connecting said prime mover output shaft to said rear wheel means.

3. The combination of claim 1 wherein said front wheel includes a first sprocket wheel fixed for rotation therewith and aligned with a second sprocket wheel carried by one of the end portions of said casing output shaft disposed outwardly of said casing, said means drivingly connecting said casing shaft to said front wheel comprising an endless chain entrained over said sprocket wheels.

References Cited in the file of this patent

UNITED STATES PATENTS

| | | |
|---|---|---|
| 2,435,021 | Seider | Jan. 27, 1948 |
| 2,445,058 | Fields | July 13, 1948 |
| 2,899,793 | Swisher | Aug. 18, 1959 |
| 2,968,902 | Brown | Jan. 24, 1961 |
| 3,045,772 | Nicolai | July 24, 1962 |

FOREIGN PATENTS

| | | |
|---|---|---|
| 521,968 | Italy | Mar. 31, 1955 |